May 24, 1966 P. B. ZEIGLER 3,252,350
TILTING STEERING WHEEL
Filed Nov. 6, 1963
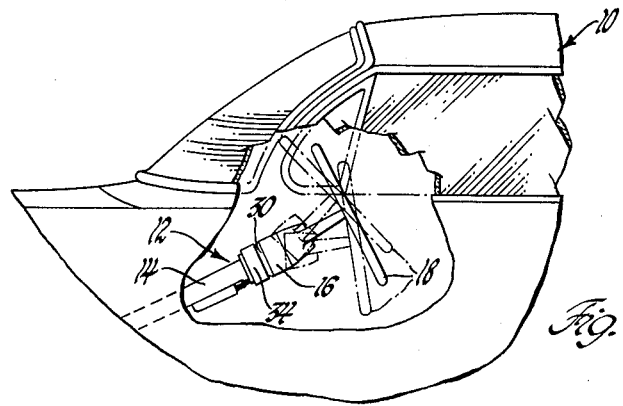
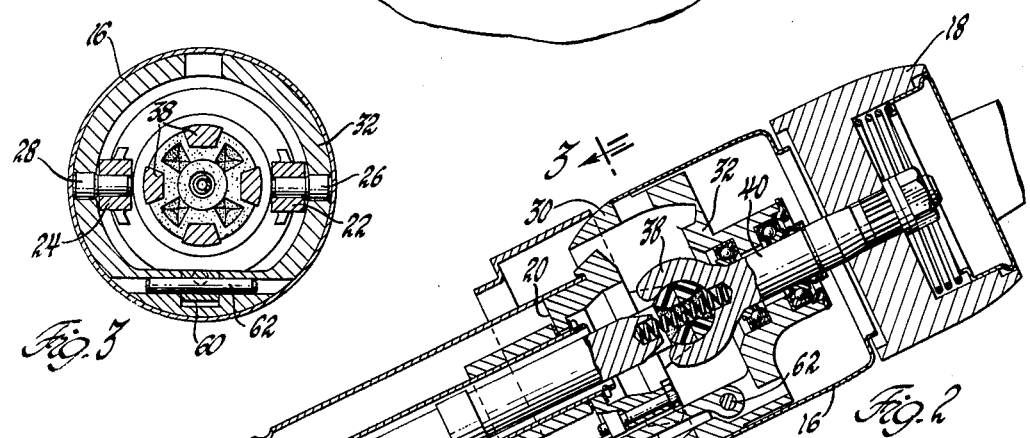
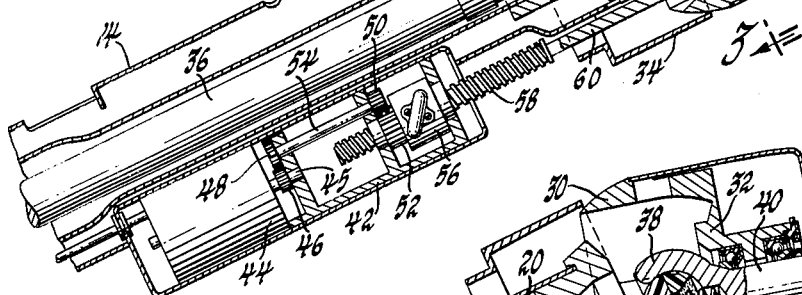
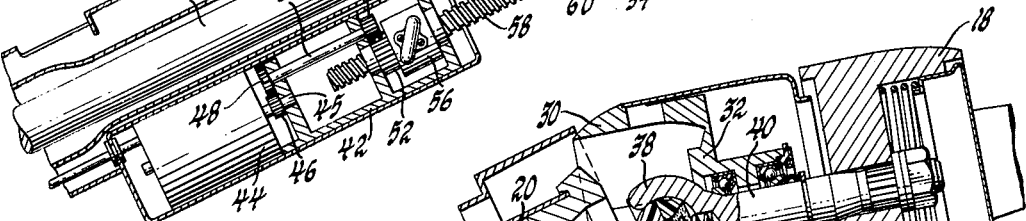
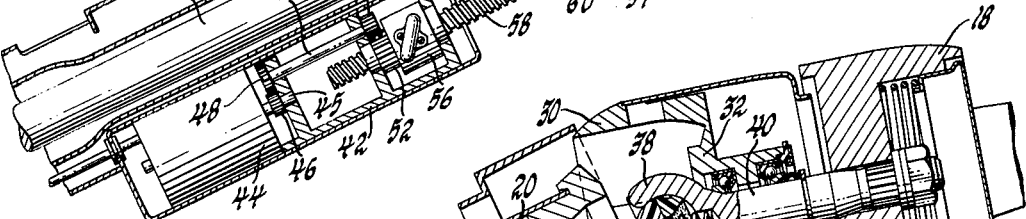
INVENTOR.
Philip B. Zeigler
BY
W. F. Wagner
ATTORNEY

United States Patent Office 3,252,350
Patented May 24, 1966

3,252,350
TILTING STEERING WHEEL
Philip B. Zeigler, Saginaw, Mich., assignor to General Motors Corporation, Detroit, Mich., a corporation of Delaware
Filed Nov. 6, 1963, Ser. No. 321,929
5 Claims. (Cl. 74—493)

This invention relates to a steering mechanism and more particularly to a steering column assembly employing motorized adjusting mechanism for tilting the steering wheel.

Co-pending patent application entitled, "Adjustable Steering Column," Serial No. 221,833 filed Sept. 6, 1962, now Patent No. 3,16,971 issued Feb. 2, 1965, and assigned to the assignee of this invention, discloses a latch type adjusting mechanism which in response to manual actuation permits the steering wheel to be tilted to a plurality of predetermined positions about a horizontal axis extending transversely of the vehicle. The difficulty with this type of adjusting mechanism is that the driver is limited to the positions provided by the latch and therefore at times cannot tilt the steering wheel to the exact driving position desired.

Accordingly, a principal object of this invention is to provide an adjusting mechanism for a steering column assembly that permits the steering wheel to be moved to an infinite number of positions between controlled upper and lower limits.

Another object of this invention is to provide an adjusting mechanism for a steering column assembly having remotely controlled motor means for tilting the steering wheel.

A further object of this invention is to provide a tiltable steering wheel having an adjustable mechanism that includes linear drive-transmitting means for moving the steering wheel to an infinite number of positions between controlled upper and lower limits.

The above and other objects are obtained with an adjustable steering assembly which in its preferred embodiment includes a fixed lower column section and an upper column section that is pivotally connected to the former. Each of the column sections rotatably support a steering shaft, the inner ends of which are interconnected by a universal joint. A steering wheel is carried by the upper column section while the lower column section includes a linear drive-transmitting means comprising a ball-nut and screw supported in a housing. Means pivotally connect one end of the screw to the upper column section and a reversible electric motor is drivingly geared to the ball-nut to drive the screw so as to cause it to move relative to the lower column section and thereby adjust the position of the upper column section.

Other objects and advantages of the subject invention will be more apparent from the following detailed description when taken in conjunction with the drawings, in which:

FIGURE 1 is a fragmentary side elevational view of a portion of a vehicle with parts being broken away to show the general location and range of movement of a steering column assembly made in accordance with the invention, FIGURE 2 is an enlarged side elevation view showing details of the construction of a steering assembly made in accordance with the invention, FIGURE 3 is a view taken on lines 3—3 of FIGURE 2, and FIGURE 4 is a view similar to FIGURE 2 illustrating the mechanism in one of the inclined positions of adjustment.

Referring now to the drawings and particularly FIGURE 1, a conventional motor vehicle 10 is shown within which a steering column assembly 12 is appropriately located. The steering column assembly comprises a fixed lower column section 14 and a tiltable upper column section 16 which includes the steering wheel 18. As shown in dotted lines, the upper column section and steering wheel are adapted for tilting movement about a horizontal transverse axis both upwardly and downwardly from the conventional position wherein the steering wheel plane is normal to the axis of the lower column section.

As best seen in FIGS. 2 and 3, the upper end of the lower column section 14 has a support housing 20 fixed thereto which includes a pair of upwardly extending ears 22 and 24 that respectively accommodate the inner ends of axially aligned pivot pins 26 and 28. The outer ends of the pivot pins are received within a downwardly projecting skirt portion 30 formed with a bearing support 32 secured in the upper column section 16. The common axis of the pivot pins 26 and 28 extends transversely of the vehicle in a horizontal plane and, as should be apparent, provides the pivot axis about which the upper column section moves relative to the lower column section. A generally cup-shaped member 34 of substantially the same diameter as the upper column section is secured near the upper end of the lower column section 14 and surrounds a portion of the skirt portion 30 to effect concealment of the internal parts of the assembly regardless of the angular inclination of the upper column section.

A conventional steering shaft 36 is rotatably supported within the lower column section and has the upper end thereof connected through a universal coupling 38 to a stub shaft 40 rotatably journaled to the bearing support 32 and connected to the steering wheel. Thus, rotational movement of the steering wheel is transmitted through the universal coupling to the steering shaft 36 irrespective of the position of the upper column with respect to the lower column section.

Adjustable tilting movement of the upper column section is realized through a motorized mechanism, a portion of which is located in a housing 42 secured to the underside of the column section 14. More specifically the mechanism comprises a reversible electric motor 44 that is fixed in the housing and, although not shown, electrically connected through a conventional double pole-double throw switch with a power source such as the vehicle battery. Preferably, the switch is mounted on the instrument panel or some other convenient location within comfortable reach of the driver so that movement of the switch actuator in a downward and upward direction causes the output shaft 45 of the motor to rotate clockwise and counterclockwise, respectively, as viewed from the lower end of column section 14.

The output shaft of the motor rigidly supports a pinion 46 which forms a portion of a gear train that includes gears 48, 50 and 52. Gears 48 and 50 are fixed to opposite ends of a rotatable shaft 54 while the gear 52 is secured to a ball-nut 56 which constitutes one part of a linear-drive arrangement that also includes a screw 58 fixed with one end of a rod member 60. The ball-nut 56 is rotatably supported by the housing 42 but is restricted from axial movement so that upon being rotated in one direction, the screw 58 is driven along its longitudinal axis towards the upper column section while rotation in the opposite direction causes the screw to move towards the lower end of column section 14. The upper end of the rod member is pivotally connected to the bearing support 32 by a transverse pin 62 so that the aforementioned movement of the screw is transformed into tilting movement of the steering wheel.

From the above description, it should be apparent that when the driver desires to tilt the steering wheel from the position of FIGURE 2 to that of FIGURE 4, he simply moves the switch actuator in the downward direction to energize the electric motor 44. Acting through the gears 46, 48, 50 and 52, the motor drives the ball-nut 56 about its axis in a clockwise direction as viewed from the motor, and thereby causes the screw to move into the housing. Similarly, the rod member 60 is drawn along its longitudinal axis towards the housing and causes the upper column section 16 to pivot downwardly about the axis of the pivot pins 26 and 28 until it reaches the position of FIGURE 4 at which time suitable cooperating stop portions (not shown) formed on the support housing 20 and the skirt portion 30 arrest further downward movement. To tilt the steering wheel in the opposite direction or upwardly from the position of FIGURE 4, the driver moves the switch actuator upwardly to reverse rotation of the motor output shaft. Accordingly, the ball-nut is driven counterclockwise and the screw extends out of the housing to move the column section 16 upwardly to the uppermost position as seen in FIGURE 1. As in the case of the downward movement, the upward movement of the steering wheel is limited by stop means not shown.

One important feature of the adjusting mechanism described above is that the driver can realize minute movement of the steering wheel. In other words, there are an infinite number of positions between the completely lowered and raised positions all of which can be obtained by controlled energization of the motor. Moreover, it should be noted that once the steering wheel is adjusted to the desired position, the ball-nut and screw prevents any back-lash and effectively locks the upper column section in position relative to the lower column section. A ball-nut and screw arrangement of a type employed in this construction can be seen in the patent to Means 2,380,662.

Various changes and modifications can be made in the described structure without departing from the spirit of the invention. It should be understood that such changes and modifications are contemplated by the inventor and therefore he does not wish to be limited except by the scope of the appended claims.

What is claimed is:
1. An adjustable steering assembly comprising a fixed lower column section and an upper column section, an upper steering shaft journaled in the upper column section, a lower steering shaft supported in the lower column section, a universal joint connecting said upper and lower shafts and permitting angular movement of the upper column section relative to the lower column section between two extreme positions, drive means including an electric motor connecting the lower column section with the upper column section for moving the upper column to an infinite number of positions between said two extreme positions.

2. An adjustable steering assembly comprising a fixed lower column section and an upper column section, an upper steering shaft journaled in the upper column section, a lower steering shaft supported in the lower column section, a universal joint connecting said upper and lower shafts and permitting angular movement of the upper column section relative to the lower column section between two extreme positions, linear drive-transmitting means connecting the lower column section with the upper column section, an electric motor, and means connecting the drive-transmitting means to said motor so that upon energization of the latter the upper column is moved about the universal joint to an infinite number of positions between said two extreme positions.

3. An adjustable steering assembly comprising a fixed lower column section and an upper column section, an upper steering shaft journaled in the upper column section, a lower steering shaft supported in the lower column section, means connecting said upper and lower shafts and permitting movement of the upper column section relative to the lower column section between two extreme positions, a steering wheel fixed to the upper shaft, linear drive-transmitting means connecting the lower column section with the upper column section, said linear drive-transmitting means comprising a ball-nut and screw supported in a housing on said lower column section, means pivotally connecting one end of said screw to said upper column, said ball-nut being supported in said housing for rotation and having a gear fixed thereto, a reversible electric motor mounted in said housing for driving said gear whereby rotation of said ball-nut causes the screw to move axially relative to the lower column section to position the upper column section between said two extreme positions.

4. An adjustable steering assembly comprising a fixed lower column section and an upper column section, an upper steering shaft journaled in the upper column section, a lower steering shaft supported in the lower column section, means connecting said upper and lower shafts and permitting movement of the upper column section relative to the lower column section between two extreme positions, a steering wheel fixed to the upper shaft, linear drive-transmitting means connecting the lower column section with the upper column section, said linear drive-transmitting means comprising a ball-nut and screw supported in a housing on said lower column section, a rod connected at one end to said screw in axial alignment therewith and along an axis substantially parallel to the longitudinal axis of the lower column section, means pivotally connecting the other end of said rod to said upper column, said ball-nut being supported in said housing for rotation and having a gear fixed thereto, a reversible electric motor mounted in said housing for driving said gear whereby rotation of said ball-nut causes the screw to move axially relative to the lower column section to position the upper column section between said two extreme positions.

5. An adjustable steering assembly comprising a fixed lower column section and an upper column section, an upper steering shaft journaled in the upper column section, a lower steering shaft supported in the lower column section, a universal joint connecting said upper and lower shafts and permitting angular movement of the upper column section relative to the lower column section between two extreme positions, a steering wheel fixed to the upper shaft, linear drive-transmitting means connecting the lower column section with the upper column section, said linear drive-transmitting means comprising a ball-nut screw supported in a housing on said lower column section, a rod connected at one end to said screw in axial alignment therewith and along an axis substantially parallel to the longitudinal axis of the lower column section, means pivotally connecting the other end of said rod to said upper column, said ball-nut being supported in said housing for rotation and having a gear fixed thereto, a reversible electric motor mounted in said housing for driving said gear whereby rotation of said ball-nut causes the screw to move axially relative to the lower column section to position the upper column section between said two extreme positions.

References Cited by the Examiner

UNITED STATES PATENTS

| 1,402,535 | 1/1922 | Page | 74—493 |
| 1,503,938 | 8/1924 | Davis | 74—486 |
| 2,074,334 | 3/1937 | Hughes | 74—493 |
| 2,581,123 | 1/1952 | Merkle. | |
| 3,167,971 | 2/1965 | Zeigler et al. | 74—493 |
| 3,170,711 | 2/1965 | Dunifon et al. | 74—493 X |
| 3,176,537 | 4/1965 | Zeigler | 74—554 X |

BROUGHTON G. DURHAM, *Primary Examiner.*

CAROLYN F. GREEN, *Assistant Examiner.*